US012133538B2

(12) United States Patent
Hühn (10) Patent No.: US 12,133,538 B2
(45) Date of Patent: Nov. 5, 2024

(54) CHOCOLATE, CHOCOLATE-LIKE PRODUCTS, CHOCOLATE CONSTRUCTION KIT AND METHODS FOR PREPARING THE SAME

(71) Applicant: ODC Lizenz AG, Stans (CH)

(72) Inventor: Tilo Hühn, Schönenberg (CH)

(73) Assignee: ODC LIZENZ AG, Stans (CH)

( * ) Notice: Subject to any disclaimer, the term of this patent is extended or adjusted under 35 U.S.C. 154(b) by 105 days.

(21) Appl. No.: 15/742,427

(22) PCT Filed: Jul. 8, 2016

(86) PCT No.: PCT/EP2016/001179
§ 371 (c)(1),
(2) Date: Jan. 5, 2018

(87) PCT Pub. No.: WO2017/005371
PCT Pub. Date: Jan. 12, 2017

(65) Prior Publication Data
US 2018/0192665 A1     Jul. 12, 2018

(30) Foreign Application Priority Data
Jul. 8, 2015   (EP) .................................... 15002046

(51) Int. Cl.
*A23G 1/00*     (2006.01)
*A23G 1/02*     (2006.01)
(Continued)

(52) U.S. Cl.
CPC ............ *A23G 1/002* (2013.01); *A23G 1/0036* (2013.01); *A23G 1/02* (2013.01); *A23G 1/06* (2013.01); *A23G 1/32* (2013.01)

(58) Field of Classification Search
None
See application file for complete search history.

(56) References Cited

U.S. PATENT DOCUMENTS

| 5,160,412 A | 11/1992 | Berg |
| 6,079,118 A | 6/2000 | Kiyokawa |

(Continued)

FOREIGN PATENT DOCUMENTS

| CN | 1252951 A | 5/2000 |
| EP | 0 711 505 A1 | 5/1996 |

(Continued)

OTHER PUBLICATIONS

Singh et al. "Recovery of Acetic Acid by Reactive Distillation . . . " vol. 46 pp. 9196-9204 2007 Ind. Eng. Chem. Ind., (Year: 2007).*

(Continued)

*Primary Examiner* — Felicia C Turner
(74) *Attorney, Agent, or Firm* — Seed IP Law Group LLP (57) ABSTRACT

The method for processing fermented or incubated cocoa beans comprises the steps of: adding water to fermented or incubated cocoa beans or nibs to form a suspension; wet grinding said suspension; subjecting said suspension to a heat treatment at a temperature of 70° C. or less; separating the suspension into a water phase (heavy phase), a fat phase (light phase) and a solid phase, said fat phase comprising cocoa butter as a major component and solids and/or water as minor components and said solid phase comprising cocoa powder and water; and separately processing the three phases, which comprises: neutralizing and/or removing acetic acid formed during fermentation or formed or added prior to or during an incubation of the cocoa beans via the water phase, and optionally separating cocoa butter from the fat phase, separating cocoa powder from the solid phase, and separating cocoa aroma and a polyphenolic powder from at least the water phase.

18 Claims, 4 Drawing Sheets

(51) Int. Cl.
    *A23G 1/06* (2006.01)
    *A23G 1/32* (2006.01)

(56) References Cited

U.S. PATENT DOCUMENTS

| | | | |
|---|---|---|---|
| 6,090,427 A | 7/2000 | Mazurek et al. | |
| 6,194,020 B1* | 2/2001 | Myers | A21D 2/36 |
| | | | 424/769 |
| 2002/0034579 A1* | 3/2002 | Biehl | A23G 1/02 |
| | | | 426/631 |
| 2013/0029007 A1* | 1/2013 | Bernaert | A23G 1/002 |
| | | | 426/45 |

FOREIGN PATENT DOCUMENTS

| | | | | |
|---|---|---|---|---|
| EP | 988794 | * | 3/2000 | A23F 3/42 |
| EP | 1680963 | * | 7/2006 | A23F 5/00 |
| JP | 11-270967 A | | 10/1999 | |
| KR | 100813176 | * | 3/2008 | A23G 1/00 |
| WO | 2010/073117 A2 | | 7/2010 | |
| WO | 2014/130539 A1 | | 8/2014 | |

OTHER PUBLICATIONS

Fujita et al. (JP 2011097832 Machine Translation May 2011) (Year: 2011).*

Chilev et al., "Investigation of Acetic Acid Dehydration by Various Methods", Journal of Chemical Technology and Metallurgy, vol. 51, No. 1, 2016, pp. 73-84.

* cited by examiner

CHOCOLATE, CHOCOLATE-LIKE PRODUCTS, CHOCOLATE CONSTRUCTION KIT AND METHODS FOR PREPARING THE SAME

FIELD OF INVENTION

This invention relates to improved methods and/or techniques for the production of chocolate or chocolate-like products. In certain embodiments, this invention relates to cocoa bean processing and chocolate manufacturing methods using fermented or incubated cocoa beans which result in chocolate or chocolate-like products with improved taste characteristics and/or increased levels of antioxidants and/or vitamins.

BACKGROUND OF THE INVENTION

The types of methods and the steps employed for processing cocoa beans into their respective food products have a significant influence on the various qualities of the resulting cocoa products such as with respect to flavor, intensity, or anti-oxidant or vitamin content and even yield. For this reason, the method employed for processing cocoa beans into cocoa products (such as food stuffs) can be critically important to the commercial viability or success or acceptance of such products (in the marketplace, or in use for enhancement of other products).

A typical cocoa bean processing procedure begins with the harvest of the beans followed by the fermenting and drying of the cocoa beans. Upon harvesting of the cocoa pods, the beans must be carefully removed from the pods to ensure that the beans are not injured in the process, since improper handling can damage the beans and causes quality problems in the product during fermentation and roasting. As with most organic material, fermentation of cocoa begins almost immediately upon exposure to air. Spores from naturally occurring yeasts settle on the sugary beans and start to split the sugar into carbon dioxide, aroma and alcohol, the latter being further converted into acetic acid by means of microbial activities provided by bacteria. At the final stage of this process (in the following referred to "natural fermentation process"), germ within the cacao bean is inactivated by the presence of alcohol, acetic acid and the heat generated by said microbial activities, resulting in a release of enzymes capable of reducing astringency within the bean, which are important to the development of the chocolate flavor. Typically, this natural cocoa fermentation process being spontaneously induced by microbial activities takes place during about two or more days until the microbial activities are inhibited by an excess of acetic acid and/or heat being caused by said microbial activities.

Once prepared for further processing, the fermented and dried cocoa beans, in conventional or prior art methods, are subjected to processing techniques such as those described in Patent Publication No. PCT/JP2002/012064.

Since much of the acetic acid is left within the beans after the fermentation is complete, it has to be removed from the beans in order to avoid sour and bitter flavors in the final cocoa product caused by the presence of acetic acid.

The above-mentioned (natural or spontaneous) cocoa fermentation process being caused by spontaneous microbial activities is not the only process that is enabled to inhibit germination of cocoa beans and, thus, to avoid the development of undesired flavors that would be produced as a result of a germination of the cocoa beans. Germination of cocoa beans can be inhibited by certain physical and/or chemical pre-treatments applied to freshly harvested cocoa beans shortly after removal of the beans from the pods. In particular, it is possible to inhibit germination of cocoa beans by incubating freshly harvested cocoa beans at an elevated temperature, e.g. at a temperature of between 25 and 70° C. for less than two days. If said incubation is not carried out under sterile (aseptic) conditions, spontaneous microbial activities may take place at least during a certain time span after removal of the cocoa beans from the pods until microbial activities are stopped as a result of the incubation. In the latter case, acetic acid is produced due to said microbial activities (even though the amount of acetic acid being produced during incubation of a certain quantity of cocoa beans is generally lower than the amount of acetic acid that would be produced by natural fermentation of the same quantity of cocoa beans).

In general, the presence of acids is considered to play an important role in the flavor development potential of cocoa beans. For instance, it has been shown that pretreatments of cocoa beans in presence of acetic acid may have a favorable effect on the development of chocolate flavor, even in the absence of natural fermentation. In a paper by V. C. Quesnel (Proceedings of "1957 Cocoa Conference", pages 150-155), it is disclosed that unfermented cocoa beans being incubated in the presence of acetic acid are more strongly flavored than those incubated in the absence of acetic acid. However, incubating cocoa beans in the presence of acetic acid may result in a reduction of chocolate flavor potential if the concentration of acetic acid is too high, as disclosed in the article "Acidification, Proteolysis and Flavour Potential in Fermenting Cocoa Beans" by Bale Biehl, Ernst Brunner, Detlef Passern, Victor C. Quesnel and Daniel Adomako, published in Journal of the Science of Food and Agriculture (J. Sci. Food Agric.) 1985, 36, pages 583-598. Accordingly, in incubations of unfermented cocoa beans in the presence of acetic acid, it is advantageous to control the pH value of the cocoa beans so that the pH value is in a certain range in order to obtain cocoa beans providing a strong chocolate flavor potential. In addition, the flavor of the incubated cocoa beans depends on the temperature of the cocoa beans achieved during the incubation. A corresponding method for processing cocoa beans is known from U.S. Pat. No. 8,501,256 B2, said method including steps such as: i) subjecting the cocoa beans to a physical pre-treatment and ii) subjecting the pre-treated cocoa beans to at least one treatment with an aqueous acidic medium until the pH of said cocoa beans reaches a value of between 3.6 and 5.5, wherein the beans are incubated in step ii) at a temperature of between 25 and 70° C. for less than 24 hours. According to U.S. Pat. No. 8,501,256 B2, said aqueous acidic medium may comprise either inorganic or organic acids with preference for amphiphilic acids; however, particularly good results were achieved using acetic acid as it has been shown to efficiently penetrate the cocoa beans and pervade biological membranes when the concentration is sufficient.

Conventionally, the concentration of acetic acid is reduced during a roasting step at typically 70 to 180° C. and the conching. However, if the acetic acid concentration in the fermented beans is too high, its reduction during roasting and conching is either insufficient, which results in a chocolate product having high acidity and bitterness, or requires drastic conditions (high temperatures, prolonged thermal exposure (e.g. over-roasting and long conching times) and/or the use of alkalizing agents to neutralize the acidic components) which may reduce the content of anti-oxidants, aromatics and vitamins, lead to the formation of undesired byproducts (e.g. acrylamides) and deteriorate the quality of the cocoa butter produced accordingly.

Moreover, for the reasons set out above, conventional processes for the manufacture of high-quality chocolate or chocolate-like products only allow the use of cocoa beans at very specific fermentation stages and having specific consistencies, which, however, are difficult to maintain due to different harvesting and drying methods and fermentation conditions employed.

Conching is generally regarded as an essential step in the process in order to develop the flavor and lower the viscosity of the product. However, because it involves maintaining the product at an elevated temperature for a relatively long time, it is energy intensive. A method and device for producing chocolate with a shortened conching time, or with no conching step, is described in WO 2004/000028, which discloses a device using a premixer which delivers chocolate flakes to a gear pump. EP 2 180 793 proposes the implementation of a plurality of specific mixing and grinding steps to increase the production capacity and to match the conching time to the rate of production of the mixture to be conched.

A further problem encountered with conventional cocoa bean processing is the destruction of cellular compartments of the raw cocoa materials due to high mechanical loads or shear stresses and/or high heat employed which aids in the extraction of cocoa fats. In US 2002/034579 A1, a process is disclosed wherein unfermented beans are deliberately treated to destroy the cellular and sub-cellular structures and then subjected to an oxidation treatment in order to obtain a low-flavor cocoa.

In this regard, WO 2010/073117 discloses a method for processing cocoa beans comprising the formation of a suspension comprising cocoa beans or nibs and water, wet grinding the suspended beans or nibs in multiple steps, heating the suspension, and decanting the same such that said suspension is separated into a water phase, a fat phase and a solid phase, in order to avoid liquefaction of the cocoa fat and formation of a chocolate liqueur during mechanical processing.

However, the problem of providing a high-quality chocolate product having at the same time an excellent texture and non-acidic and non-bitter taste while requiring shorter conching durations to render the manufacturing process more efficient and further reduce the thermal load upon the cocoa bean extracts has hitherto not been adequately addressed.

Accordingly, the provision of methods and products that overcome the above disadvantages is desirable.

SUMMARY OF THE INVENTION

The present invention solves this object with the subject matter of the claims as defined herein. The advantages of the present invention will be further explained in detail in the section below and further advantages will become apparent to the skilled artisan upon consideration of the invention disclosure.

Generally speaking, in one aspect the present invention provides a method for processing fermented or incubated cocoa beans or nibs characterized by the steps of: adding water to fermented cocoa beans or nibs to form a suspension; wet grinding said suspension; subjecting said suspension to a heat treatment at a temperature of 70° C. or less; separating the suspension into three phases, i.e. a water phase (heavy phase), a fat phase (light phase) and a solid phase, said fat phase comprising cocoa butter as a major component and solids and/or water as minor components and said solid phase comprising cocoa powder and water; and separately processing the three phases, which comprises neutralizing and/or removing acetic acid formed during fermentation or formed or added prior to or during an incubation of the cocoa beans via the water phase, and optionally separating cocoa butter from the fat phase, separating cocoa powder from the solid phase, and separating cocoa aroma and a polyphenolic powder from at least the water phase.

A further aspect of the present invention is the provision of a chocolate construction kit comprising the polyphenolic powder, cocoa powder, cocoa butter and cocoa aroma extracts obtained by the cocoa bean/nib processing methods as described above.

In another aspect, the present invention provides a method for producing chocolate or chocolate-like products comprising the steps of: adding water to fermented or incubated cocoa beans or nibs to form a suspension; wet grinding said suspension; subjecting said suspension to a heat treatment at a temperature of 70° C. or less; separating the suspension into three phases, i.e. a water phase (heavy phase), a fat phase (light phase) and a solid phase, said fat phase comprising cocoa butter as a major component and solids and/or water as minor components and said solid phase comprising cocoa powder and water; and separately processing the three phases, which comprises neutralizing and/or removing acetic acid formed during fermentation or formed or added prior to or during an incubation of the cocoa beans via the water phase, separating cocoa butter from the fat phase, separating cocoa powder from the solid phase, and separating cocoa aroma and a polyphenolic concentrate from at least the water phase; recombining the cocoa aroma extract with the cocoa butter extract; mixing the recombined extracts with the cocoa powder extract, polyphenolic powder extract and/or milk powder; and conching said mixture.

A further aspect of the present invention are chocolate or chocolate-like products obtained by using the aforementioned methods or the aforementioned chocolate construction kit.

DETAILED DESCRIPTION OF THE INVENTION

For a more complete understanding of the present invention, reference is now made to the following description of the illustrative embodiments thereof:

Method for Processing Fermented Cocoa Beans and/or Nibs

The method for processing fermented cocoa beans or nibs according to a first embodiment of the present invention is generally characterized by the steps of: adding water to fermented or incubated cocoa beans or nibs to form a suspension; wet grinding said suspension; subjecting said suspension to a heat treatment at a temperature of 70° C. or less; separating the suspension into three phases, i.e. a water phase (heavy phase), a fat phase (light phase) and a solid phase, said fat phase comprising cocoa butter as a major component and solids and/or water as minor components and said solid phase comprising cocoa powder and water; and separately processing the three phases, which comprises neutralizing and/or removing acetic acid formed during fermentation or formed or added prior to or during an incubation of the cocoa beans via the water phase, separating cocoa butter from the fat phase, separating cocoa powder from the solid phase, and separating cocoa aroma and a polyphenolic concentrate from at least the water phase.

The expressions "separating cocoa butter from the fat phase" and "separating cocoa powder from the solid phase" refers to operations by which a concentration of the major components cocoa butter (in the fat phase) or the cocoa powder (in the solid phase), respectively, is achieved. The expression "separating cocoa aroma and a polyphenolic powder from at least the water phase" refers to operations by which cocoa aroma and polyphenolic powder are retrieved from the respective phase in a concentrated form. These operations may include, but are not limited to filtration, drying processes (e.g. evaporation of residual water, optionally under vacuum conditions) and/or centrifugation, for example.

Initially, the subject cocoa processing technique generally begins with forming a suspension of fermented or incubated cocoa beans or nibs by adding water, either prior or during the grinding of the cocoa beans/nibs. As a starting material, whole fermented or incubated beans may be used, or fermented or incubated beans which are subsequently subjected to a "breaking" step during which the beans are broken into smaller, non-whole bean particles (e.g., cocoa nibs).

Water is added to form the cocoa bean/nib suspension.

While not being particularly limited, the weight ratio of water to cocoa beans/nibs in the formed suspension is preferably between 1:1 to 6:1, more preferably 2:1 to 4:1, especially preferably about 3:1, which may advantageously affect the processability in the further steps (e.g. facilitated pumping, grinding and easier phase separation).

If desirable from the viewpoint of introducing additional flavors, alternative water-containing liquids may also be used as a source of water, preferably liquids selected from one or more of coffee, tea and liquids having water contents of from 60 to about 95% by weight, such as fruit juices, fruit juice concentrates, or milk, for example. In such a case, it is preferable that the water content in the formed suspension falls into the above-defined ratios. Since the thermal load in the further method steps is relatively low, temperature-sensitive flavors originating from said liquids are retained and may favorably interact with the primary and secondary flavors of the cocoa bean.

In order to obtain coffee-flavored cocoa products, coffee beans (whole or broken, unroasted or roasted) may be mixed to the fermented cocoa beans/nibs when forming the suspension in water, provided that the cocoa beans/nibs form the major part in the bean mixture so that the content of coffee beans does not interfere or negatively affect the wet milling and phase separation steps. Preferably, the coffee bean content is less than 20% by weight of the bean mixture, more preferably less than 10% by weight.

The cocoa beans/nibs are subjected to a single or multiple wet grinding step(s), which result in bean particle sizes of preferably 50 µm or smaller, more preferably 40 µm or smaller, even more preferably 20 µm or smaller. Reducing the bean particles to such a size range substantially increases the exposed surface area of the bean particle material therefore allowing it to be more efficiently wet (e.g., with water rather than a chemical solvent) for improved extraction results (such as improved extraction of fats or lipids, aromatic substances, and/or polyphenols). The bean particle size reduction may be accomplished by using disc mills (e.g. perforated disc mill), colloid mills (e.g. toothed colloid mills), or corundum stone mills, for example. It is preferable that in at least one grinding step, cocoa bean cells are macerated to enable the solvent (water) to wet the cocoa bean material better due to increased available surface area of the macerated cocoa beans. The methods and devices used for wet milling are not particularly limited as long as undesirable emulsification by significant frictional heat production or high mechanical forces is avoided. For example, when using multiple grinding steps, a coarse wet grinding step (e.g., optionally with further water) may be carried out using a perforated disc mill, and the coarsely milled suspension may be pumped to a toothed colloid mill for a fine grinding step.

After the wet grinding step, the suspension is subjected to a thermal treatment at a temperature of no more than approximately 70° C. in order to reduce the overall thermal load and prevent emulsification. From the viewpoint of a favorable balance of cocoa butter yield and preservation of desirable flavors, such as aromatics, anti-oxidants and/or vitamins, heating temperatures of from 43 to 65° C. are preferable. In terms of cocoa butter liquefaction and/or improved mechanical phase separation, a heating temperature range of from 45 to 50° C. is particularly preferable. Without being limited thereto, heating of the wet-milled suspension may be carried out by a scrap or tube heat exchanger.

Thereafter, phase separation is carried out so that three phases, i.e. a water phase (heavy phase), a fat phase (light phase) and a solid phase are obtained, said fat phase comprising cocoa butter as a major component and solids and/or water as minor components and said solid phase comprising cocoa powder and water. In addition, the solid phase may comprise residual cocoa butter in a content of up to 30% by weight, preferably less than 27% by weight, more preferably less than 20% by weight relative to the total dry weight. Preferably, devices employing centrifugal forces may be utilized to achieve mechanical particle separations, such as decanters or nozzle separators. For instance, the suspension may be decanted to separate coarse or large or high mass solids from liquid(s) and then smaller and/or fine solid particles may be further separated from liquids and/or oil products may be separated from non-oil products.

Multiple phase separation and recombination steps may be employed to achieve an improved separation between the water phase (heavy phase), the fat phase (light phase) and the solid phase. For example, the fat phase obtained by an initial decanting step may be further filtered or centrifuged to separate remaining fine particles or water from the fat phase and the thus obtained fine particles and water may be recombined with the water and solid phases from the initial decanting step or at a later processing stage of said phases. Also, the water phase may be subjected to further purification steps, e.g. by filtration using vacuum rotation filters in order to remove fine particles and reduce cloudiness of the liquid.

Figure 1:
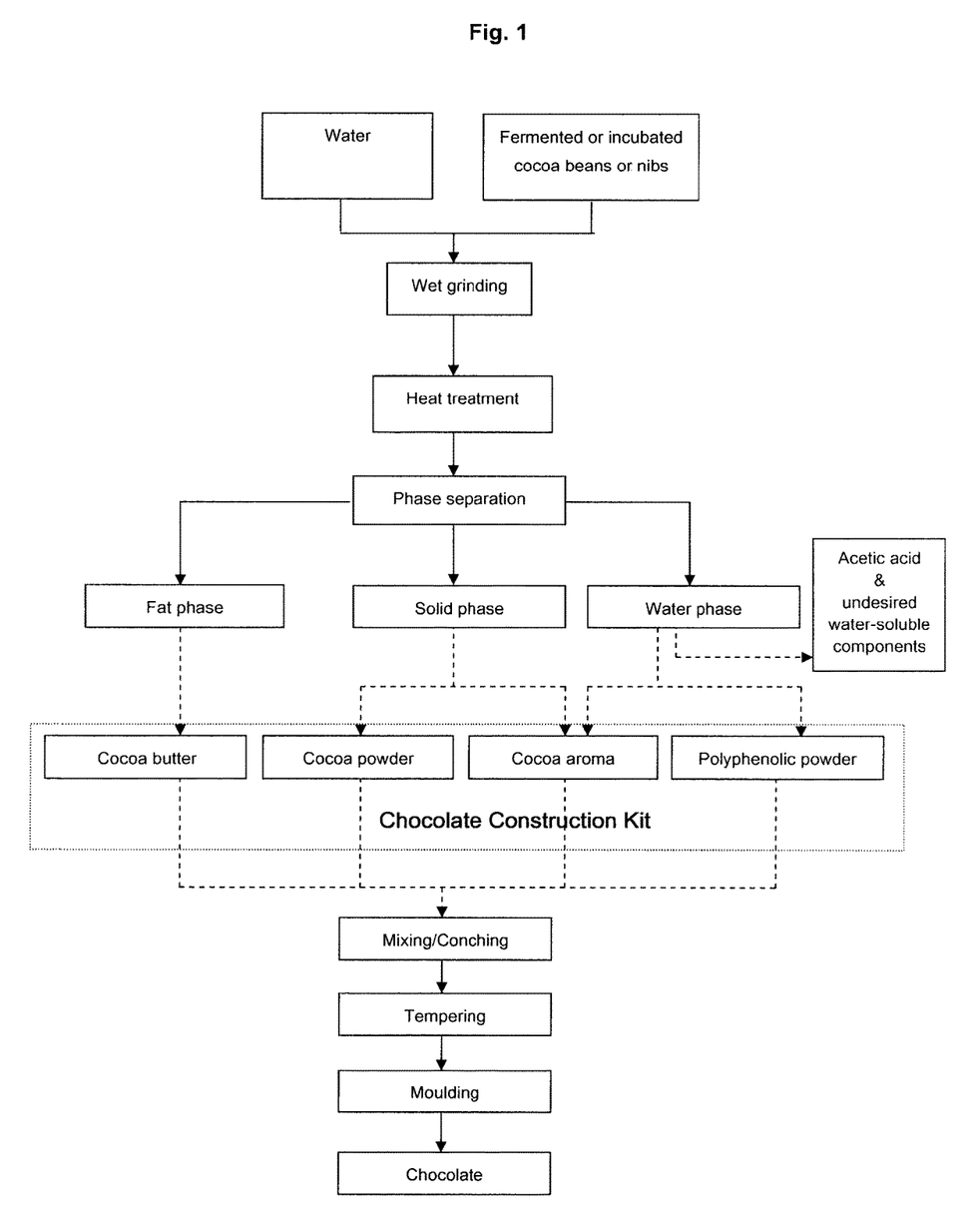
FIG. 1 schematically illustrates the method for processing the fermented cocoa beans up to the provision of a chocolate construction kit, as well as the following method of manufacturing chocolate according to the subject invention.

Upon separation of the three phases (i.e. the water phase (heavy phase), the fat phase (light phase) and the solid phase), these may be independently processed to separate cocoa butter (from the fat phase), cocoa powder (from the solid phase), cocoa aroma (from at least the water phase, optionally also from the solid phase) and a polyphenolic concentrate (from the water phase), as is illustrated by FIG. 1.

As indicated above, the fat phase (light phase) may be filtered (e.g. by employing a vibrating screen) and/or conveyed to a 3-phase separator (e.g. centrifuge) to remove fine particles (which may be optionally added to the solid phase prior or during the drying/roasting step) and residue water (which may be optionally added to the water phase prior to aroma recovery). Cocoa butter is obtained by filtering the purified fat phase.

The (wet) solid phase obtained after separation in the three phases may be optionally treated with a heatable roll grinder to reduce particle size and begin pre-drying. Also, sugar, sugar solution and/or fruit juices may optionally be added to separated cocoa solids before drying to improve flavor development during the drying/roasting process.

The solid phase obtained after separation in the three phases may be gently dried and simultaneously roasted at a temperature of between 55 and 100° C., from the viewpoint of reducing the thermal load and preserving the health-inducing components preferably at a temperature selected from between 55 and 70° C. under reduced pressure, in order to allow roasted flavors and other aromatics to be collected. If desired, said flavors and other aromatics may be added to the cocoa butter or to the aroma recovery step of the water phase in the further progress of the cocoa bean processing method.

The method of carrying out the drying/roasting is not particularly limited and may e.g. be accomplished in a drum dryer.

In a preferred embodiment, the drying/roasting step is carried out in a mixing device as is disclosed in EP 0 711 505 A1 for chocolate conching. Said mixing device comprises a cylindrical, tubular body arranged with its axis horizontal and closed at its opposite ends by end plates, and having a coaxial heating or cooling jacket through which, for example, diathermic oil or another fluid is intended to flow to keep the internal wall of the body at a predetermined temperature. The tubular body has an inlet and outlet openings for the solid phase. The outlet opening communicates, by means of a duct, with a device for separating the aroma phase from the dried product. The device further comprises a bladed rotor is supported for rotation in the tubular body, its blades being arranged as a helix and oriented for centrifuging the solid phase being processed and simultaneously transporting it towards the outlet opening. Using this mixing device advantageously allows the drying/roasting step and the separation of the roasted flavors and other aromatics to be carried out continuously and also remarkably accelerates the processing of cocoa beans up to the preparation of the cocoa powder (dry cocoa matter), resulting in processing durations of less than 20 minutes, typically less than 15 minutes.

In the above-described cocoa bean/nib processing methods, most of the acetic acid formed during fermentation or formed or added prior to or during an incubation of the cocoa beans will be found in the water phase and may thus be conveniently neutralized and/or removed by treating the water phase appropriately upon phase separation. For this reason, water-soluble acids may be added prior to phase separation in any desired amount deemed favourable with regard to the adjustment of the pH conditions and/or for the purpose of improving the flavor development within the cocoa beans or nibs, since their addition does not necessarily result in a sour or bitter taste in the final product.

Figure 2:
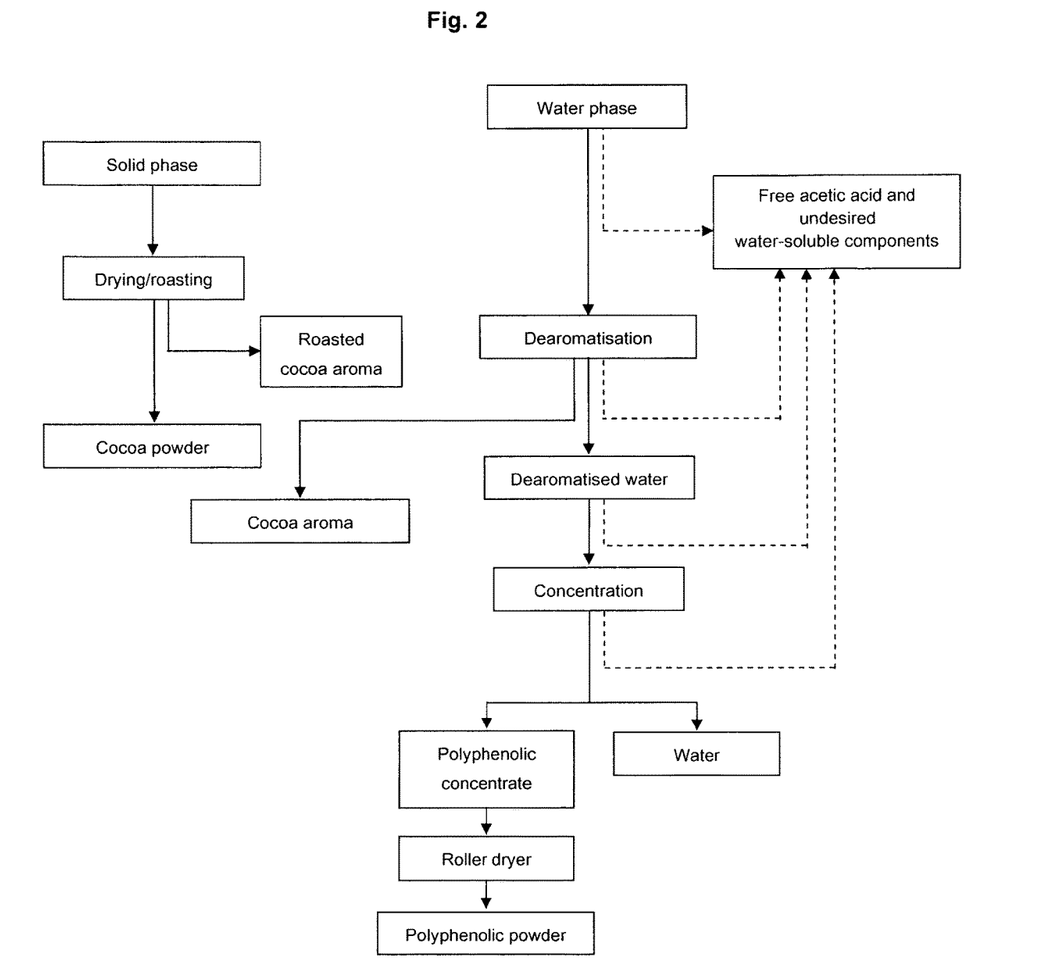
FIG. 2 schematically illustrates an exemplary treatment of the water phase upon phase separation.

The method of removing free acetic acid via the water phase is not particularly limited and may be carried out by any suitable method known in the art. For example, acetic acid may be removed from the water phase by e.g. distillation (e.g. extractive distillation or reactive distillation), extraction (e.g. liquid-liquid) extraction, emulsion-type liquid membrane processes, salting out or combinations thereof. Alternatively, acetic acid may remain in the water phase if cocoa aroma and polyphenolic powder are selectively extracted therefrom. As is illustrated in FIG. 2, free acetic acid and optionally other water-soluble components may be removed from the water phase prior to or during the dearomatisation step, and/or prior to or during the concentration step.

The neutralization and/or removal of free acetic acid via the water phase has significant advantages over the methods disclosed in prior art, a few of which will be discussed in the following:

Acetic acid is extracted from the cocoa beans or nibs via the water phase prior to subjecting the solid phase to a drying/roasting step. Therefore, prolonged drying/roasting and high thermal loads upon the fermented cocoa beans are not required in order to evaporate acetic acid, whereby high contents of aromatic flavors, anti-oxidants, vitamins may be preserved. Also, the duration of the conching process may be significantly reduced.

Furthermore, since the relatively high costs involved with the use of water and its removal are far outweighed by energy savings due to heating at lower temperatures and accelerated drying/roasting and conching steps, the method according to the present invention also involves economic advantages when compared to conventional methods for the preparation of cocoa products.

In addition, in contrast to conventional cocoa product manufacturing, cocoa beans having relatively high acetic acid contents and/or being in varying fermentation stages may be used to produce high-quality cocoa products, such as chocolate.

A further advantage of the present invention is that undesired hydrophilic components (such as bitter and/or astringent low molecular polyphenols (e.g. catechins)) may likewise be removed via the water phase.

It has further been found that the water phase obtained in the decanting step also contains desired flavors, which may be recovered by subjecting the water phase to a first concentration step to obtain aromatics. Additionally, enhancement of cocoa flavors may be achieved using reverse flow distillation (i.e., to separate flavor compounds and water).

In an optional second concentration phase, evaporation of excessive water may performed to obtain polyphenolic powder.

Removal of undesired water may be achieved using evaporation techniques which, when employed, can desirably, result in water suspended flavor compounds. Moreover, concentrated polyphenols may result. In yet still further embodiments, recovered cocoa flavors may be enhanced by reverse flow distillation (e.g, to separate flavor components from water), which is preferably carried out under low pressure (less than 300 mbar) and room temperature in order to minimize the thermal load.

In general, if there is microorganism spoilage of cocoa extracted materials (i.e. cocoa butter, cocoa powder, cocoa aroma and polyphenolic concentrate), such material can be deodorized employing a vacuum de-aerator. Moreover, if microorganism contamination occurs, a high pressure treatment such as pascalisation is possible (e.g., which is desirable because it can preserve aromatic compounds). However, if both microorganism spoilage and contamination occurs, heat treatment and deodorization may be employed. Advantageously, the method according to the present invention allows a fast processing of the cocoa beans/nibs, so that growth of microorganisms may be kept at a minimum, however.

Using the herein described technique(s), cocoa beans may be efficiently processed to produce desirable, commercially valuable yields of dried and extracted cocoa powder, cocoa butter with hydrophobic cocoa flavor, hydrophilic cocoa flavor, and polyphenol concentrates. Moreover, certain resultant cocoa products retain or contain desirable levels of anti-oxidants and/or vitamins and/or possess more desirable (e.g., less bitter) flavors which, in turn, do not require sugar additions (or, at least, high levels or sugar additions) when used in food stuffs.

Chocolate Construction Kit

In a second embodiment, a chocolate construction kit including a plurality of cocoa bean extraction products produced in accordance with method steps set forth in the first embodiment outlined above is provided. In other words, the chocolate construction kit according to the present invention essentially comprises the polyphenolic powder, cocoa powder, cocoa butter and cocoa aroma extracts obtained by the cocoa bean/nib processing methods as described above. Preferred embodiments of extracts (which may be combined as desired) to be used in the kit of the present invention will be specified in the following:

In a preferred embodiment, the cocoa butter comprises a total concentration of 2-acetylpyrazine, methylpyrazine, tetramethylpyrazine, 2,3-dimethylpyrazine, 2,6-dimethylpyrazine, 2,5-dimethylpyrazine, trimethylpyrazine, ethylpyrazine, 2-ethyl-3-methylpyrazine, 2-ethyl-6-methylpyrazine, 2-ethyl-5-methylpyrazine, 2-ethyl-3,6-dimethylpyrazine, 2-ethyl-3,4-dimethylpyrazine, 2,3-diethyl-5-methylpyrazine, 2-isopropyl-3-methoxypyrazine, 2-isobutyl-3-methoxypyrazine, 2-ethyl-3,4-dimethylpyrazine, 1-methyl-1H-pyrrole, ethyl-2-methyl butanoate, 3-methylbutyl acetate, 2-heptanone, hexyl acetate, linaool, benzyl alcohol, 2-phenylethanol, ethyl cinnamate, 2-phenethyl acetate, 2-phenyl-2-butenal, ethyloctanoate, 4-ethyl guaiacol, 4-vinyl guaiacol; vanillin, isobutanal, 2-methyl butanal, isovaleradehyde, acetoin, diacetyl, furfural, 2-acetylfurane, benzaldehyde, 5-methylfurfural, 2-furanmethanol, methional, phenylacetaldehyde, and 4-methylphenol of at least 5 mg/kg, more preferably at least 20 mg/kg, especially preferably at least 40 mg/kg based on the total weight of the cocoa butter. In a further embodiment, the cocoa butter has a total concentration of acetic acid, propionic acid, isobutyric acid, 2-methylbutyric acid, 3-methylbutanoic acid, and pentanoic acid of preferably less than 15 mg/kg, more preferably less than 14 mg/kg, especially preferably less than 13 mg/kg, based on the total weight of the cocoa butter.

In a preferred embodiment, the cocoa powder comprises a total concentration of 2-acetylpyrazine, methylpyrazine, tetramethylpyrazine, 2,3-dimethylpyrazine, 2,6-dimethylpyrazine, 2,5-dimethylpyrazine, trimethylpyrazine, ethylpyrazine, 2-ethyl-3-methylpyrazine, 2-ethyl-6-methylpyrazine, 2-ethyl-5-methylpyrazine, 2-ethyl-3,6-dimethylpyrazine, 2-ethyl-3,4-dimethylpyrazine, 2,3-diethyl-5-methylpyrazine, 2-isopropyl-3-methoxypyrazine, 2-isobutyl-3-methoxypyrazine, 2-ethyl-3,4-dimethylpyrazine, 1-methyl-1H-pyrrole, ethyl-2-methyl butanoate, 3-methylbutyl acetate, 2-heptanone, hexyl acetate, linaool, benzyl alcohol, 2-phenylethanol, ethyl cinnamate, 2-phenethyl acetate, 2-phenyl-2-butenal, ethyloctanoate, 4-ethyl guaiacol, 4-vinyl guaiacol; vanillin, isobutanal, 2-methyl butanal, isovaleradehyde, acetoin, diacetyl, furfural, 2-acetylfurane, benzaldehyde, 5-methylfurfural, 2-furanmethanol, methional, phenylacetaldehyde, and 4-methylphenol of at least 8 mg/kg, more preferably at least 9 mg/kg, especially preferably at least 10 mg/kg based on the total weight of the cocoa powder. In a further embodiment, the cocoa powder has a total concentration of acetic acid, propionic acid, isobutyric acid, 2-methylbutyric acid, 3-methylbutanoic acid, and pentanoic acid of preferably less than 60 mg/kg, more preferably less than 50 mg/kg, especially preferably less than 45 mg/kg, each based on the total weight of the cocoa powder.

In a preferred embodiment, the cocoa aroma comprises a total concentration of 2-acetylpyrazine, methylpyrazine, tetramethylpyrazine, 2,3-dimethylpyrazine, 2,6-dimethylpyrazine, 2,5-dimethylpyrazine, trimethylpyrazine, ethylpyrazine, 2-ethyl-3-methylpyrazine, 2-ethyl-6-methylpyrazine, 2-ethyl-5-methylpyrazine, 2-ethyl-3,6-dimethylpyrazine, 2-ethyl-3,4-dimethylpyrazine, 2,3-diethyl-5-methylpyrazine, 2-isopropyl-3-methoxypyrazine, 2-isobutyl-3-methoxypyrazine, 2-ethyl-3,4-dimethylpyrazine, 1-methyl-1H-pyrrole, ethyl-2-methyl butanoate, 3-methylbutyl acetate, 2-heptanone, hexyl acetate, linaool, benzyl alcohol, 2-phenylethanol, ethyl cinnamate, 2-phenethyl acetate, 2-phenyl-2-butenal, ethyloctanoate, 4-ethyl guaiacol, 4-vinyl guaiacol; vanillin, isobutanal, 2-methyl butanal, isovaleradehyde, acetoin, diacetyl, furfural, 2-acetylfurane, benzaldehyde, 5-methylfurfural, 2-furanmethanol, methional, phenylacetaldehyde, and 4-methylphenol of at least 800 mg/kg, more preferably at least 1 g/kg, especially preferably at least 1.5 g/kg based on the total weight of the cocoa aroma. In a further embodiment, the cocoa aroma has a total concentration of acetic acid, propionic acid, isobutyric acid, 2-methylbutyric acid, 3-methylbutanoic acid, and pentanoic acid of preferably less than 50 g/kg, more preferably less than 20 g/kg, especially preferably less than 5 g/kg, each based on the total weight of the cocoa aroma.

In a further preferred embodiment, the polyphenolic powder comprises a total concentration of 2-acetylpyrazine, methylpyrazine, tetramethylpyrazine, 2,3-dimethylpyrazine, 2,6-dimethylpyrazine, 2,5-dimethylpyrazine, trimethylpyrazine, ethylpyrazine, 2-ethyl-3-methylpyrazine, 2-ethyl-6-methylpyrazine, 2-ethyl-5-methylpyrazine, 2-ethyl-3,6-dimethylpyrazine, 2-ethyl-3,4-dimethylpyrazine, 2,3-diethyl-5-methylpyrazine, 2-isopropyl-3-methoxypyrazine, 2-isobutyl-3-methoxypyrazine, 2-ethyl-3,4-dimethylpyrazine, 1-methyl-1H-pyrrole, ethyl-2-methyl butanoate, 3-methylbutyl acetate, 2-heptanone, hexyl acetate, linaool, benzyl alcohol, 2-phenylethanol, ethyl cinnamate, 2-phenethyl acetate, 2-phenyl-2-butenal, ethyloctanoate, 4-ethyl guaiacol, 4-vinyl guaiacol; vanillin, isobutanal, 2-methyl butanal, isovaleradehyde, acetoin, diacetyl, furfural, 2-acetylfurane, benzaldehyde, 5-methylfurfural, 2-furanmethanol, methional, phenylacetaldehyde, and 4-methylphenol of at least 1 mg/kg, more preferably at least 1.4 mg/kg, especially preferably at least 1.8 mg/kg based on the total weight of the polyphenolic powder. In a further embodiment, the polyphenolic powder has a total concentration of acetic acid, propionic acid, isobutyric acid, 2-methylbutyric acid, 3-methylbutanoic acid, and pentanoic acid of preferably less than 2 g/kg, more preferably less than 1 g/kg, especially preferably less than 0.5 g/kg, each based on the total weight of the cocoa powder.

The abovementioned total concentrations in each of the extracts may be determined via conventional Gas Chromatography Mass Chromatography (GC-MS) methods known to the skilled artisan.

In a further preferred embodiment, the cocoa powder has a total polyphenol content of at least 20 mg ECE((−)-epicatechin equivalents)/g of defatted dry matter, more preferably at least 30 mg ECE/g of defatted dry matter, especially preferably at least 40 mg ECE/g of defatted dry matter. Preferably, the cocoa powder has a flavonoid concentration of at least 10 mg ECE/g of defatted dry matter, more preferably at least 20 mg ECE/g of defatted dry matter, especially preferably at least 30 mg ECE/g of defatted dry matter. In another preferred embodiment, the cocoa powder has a proanthocyanidine concentration of at least 2 mg PCE(procyanidin B2 equivalents)/g of defatted dry matter, more preferably at least 3 mg PCE/g of defatted dry matter, especially preferably at least 4 mg PCE/g of defatted dry matter.

In a further preferred embodiment, the polyphenolic powder has a total polyphenol content of at least 50 mg ECE/g of defatted dry matter, more preferably at least 60 mg ECE/g of defatted dry matter, especially preferably at least 65 mg ECE/g of defatted dry matter. Preferably, the polyphenolic powder has a flavonoid concentration of at least 20 mg ECE/g of defatted dry matter, more preferably at least 30 mg ECE/g of defatted dry matter, especially preferably at least 35 mg ECE/g of defatted dry matter. In another preferred embodiment, the polyphenolic powder has a proanthocyanidine concentration of at least 2 mg PCE/g of defatted dry matter, more preferably at least 3 mg PCE/g of defatted dry matter, especially preferably at least 4 mg PCE/g of defatted dry matter.

The total polyphenol content, and the flavonoid and proanthocyanidine concentrations may be determined by common spectrophotometric methods known to the skilled artisan. For example, the total polyphenol content may be determined by using a Folin-Ciocalteu assay with (−)-epicatechin as standard, in accordance with the method disclosed in Folin-Ciocalteu index, *Off. J. Eur. Communities* 1990, 41, 178-179, and Cooper et al., *J. Agric. Food Chem* 2008, 56, 260-265. The total flavonoid content may be determined by means of an aluminum chloride colorimetric assay, for example, in accordance with Emelda et al. *Int. J. ChemTech Res.* 2014, 6(4), 2363-2367, using (−)epicatechin as standard. An acid-butanol method (such as e.g. Bates-Smith assay or a Porter method) using procyanidin B2 as standard may be employed to spectrophotometrically determine the content of proanthocyanidine.

As an example illustrating the aroma profile of the extracts, cocoa butter, cocoa powder, cocoa aroma and polyphenolic powder have been produced in accordance with the exemplary scheme illustrated by FIG. 1, starting from non-roasted cocoa beans which have been roasted prior to forming the water suspension and without neutralizing and/or removing acetic acid from the water phase.

Different flavor types have been quantified in the cocoa butter, cocoa powder and the water phase (and aroma phase, respectively) obtained by the presently claimed method as well as in commercially available cocoa powder and cocoa butter by using GC-MS. Specifically, raw/earthy flavors have been quantified by the total concentration of 2-acetylpyrazine, methylpyrazine, tetramethylpyrazine, 2,3-dimethylpyrazine, 2,6-dimethylpyrazine, 2,5-dimethylpyrazine, trimethylpyrazine, ethylpyrazine, 2-ethyl-3-methylpyrazine, 2-ethyl-6-methylpyrazine, 2-ethyl-5-methylpyrazine, 2-ethyl-3,6-dimethylpyrazine, 2-ethyl-3,4-dimethylpyrazine, 2,3-diethyl-5-methylpyrazine, 2-isopropyl-3-methoxypyrazine, 2-isobutyl-3-methoxypyrazine, 2-ethyl-3,4-dimethylpyrazine; fruity/flowery flavors have been quantified by the total concentration of 1-methyl-1H-pyrrole, ethyl-2-methyl butanoate, 3-methylbutyl acetate, 2-heptanone, hexyl acetate, linaool, benzyl alcohol, 2-phenylethanol, ethyl cinnamate, 2-phenethyl acetate, 2-phenyl-2-butenal and ethyloctanoate; the spicy flavors have been quantified by the total concentration of 4-ethyl guaiacol and 4-vinyl guaiacol; malty/buttery flavors have been quantified by the total concentration of vanillin, isobutanal, 2-methyl butanal, isovaleradehyde, acetoin and diacetyl; grilled/roasted flavors have been quantified by the total concentration of furfural, 2-acetylfurane, benzaldehyde, 5-methylfurfural, 2-furanmethanol, methional, phenylacetaldehyde, and 4-methylphenol; and stinging/acidic flavors have been quantified by the total concentration of acetic acid, propionic acid, isobutyric acid, 2-methylbutyric acid, 3-methylbutanoic acid, and pentanoic acid. The results of the measurements are shown in Table 1.

TABLE 1

| Flavor type | Concentration in cocoa butter | | Concentration in cocoa powder | | Concentration in water phase (without acid removal) | Concentration in cocoa aroma extract (150x water phase concentrate) *[mg/kg] | Concentration in polyphenolic powder |
| --- | --- | --- | --- | --- | --- | --- | --- |
| | Invention | Comp. Example | Invention | Comp. Example | | | |
| raw/earthy [µg/kg] | 949.2 | 18.6 | 1.066 | 0.728 | 2106.9 | 316.032* | 510.5 |
| fruity/flowery [µg/kg] | 23073.7 | 9.4 | 1.213 | 2.181 | 3766.5 | 564.981* | 777.4 |
| spicy [µg/kg] | 16.5 | 1.0 | — | — | 1.0 | 0.150* | 1.0 |
| malty/buttery/roasty [µg/kg] | 17773.1 | 1667.4 | 7.901 | 4.595 | 5013.5 | 752.030* | 18317.2 |
| total [µg/kg] | 41812.5 | 1696.4 | 10.18 | 7.504 | 10887.9 | 1633.193* | 19606.1 |
| stingy/acidic [mg/kg] | 12.1 | 19.3 | 40.05 | 100.20 | 486.0 | 72.859 | 1245.8 |

As is shown in Table 1, the total content of flavors that are perceived as pleasant (i.e. raw/earthy, fruity/flowery, spicy, and malty/buttery/roasty) is substantially higher in the cocoa butter obtained by the method of the present invention when compared to commercially available cocoa butter. The same observation is made with cocoa powder obtained by the method of the present invention when compared to conventionally manufactured cocoa powder. In contrast, it is shown that the concentration of stingy/acidic flavors in these extracts is remarkably lower than in the commercially available products, since a large fraction thereof remains in the water phase. By removing and/or neutralizing the acetic acid and other undesired water-soluble components, unpleasantly sour, bitter and/or stinging taste in the resulting products may thus be easily avoided without sacrificing the flavors perceived as pleasant.

As an example, the polyphenol, flavonoid and proantocyanidine contents of cocoa extracts and a dark chocolate obtained by the method illustrated in FIG. 1 have likewise been analyzed by means of a Folin-Ciocalteu assay, an aluminum chloride assay (both with (−)-epicatechin as standard) and an acid-butanol method (using procyanidin B2 as standard). The results are given in Table 2.

obtained from the drying/roasting step (as indicated in FIG. 2) are first added to the cocoa butter. Before being subjected to a conching step, the dried and roasted solid cocoa powder is mixed with cocoa butter with added aroma and fine milled. Polyphenolic powder may be added to the mixture as desired to provide more intense flavors and higher contents of antioxidants in the final product. Additional tailoring of flavor or development of flavor may be performed by adding one or more of sugar, sweetener, cocoa pulp and/or fruit juices. For the preparation of milk chocolate, milk powder is further added, preferably prior to the mixing step. Optionally, an emulsifying agent (e.g. lecithin) may be added prior to conching to reduce viscosity, control sugar crystallization and the flow properties of chocolate, and help in the homogeneous mixing of ingredients. Also, additional ingredients

TABLE 2

|  | raw cocoa beans (non-roasted) | raw cocoa beans (roasted) | solid phase after phase separation | water phase after phase separation | polyphenolic powder | chocolate product |
|---|---|---|---|---|---|---|
| total polyphenol concentration (mg ECE*/g defatted dry matter) | 84.1 ± 2.7 | 64.4 ± 1.3 | 60.4 ± 2.7 | 2.1 ± 0.1 | 66.2 ± 3.9 | 23.5 ± 0.6 |
| flavonoid concentration (mg ECE/g defatted dry matter) | 57.8 ± 2.9 | 40.8 ± 1.8 | 37.2 ± 2.4 | 1.2 ± 0.1 | 39.7 ± 2.4 | 14.1 ± 0.3 |
| proanthocyanidine concentration (mg PCE**/g defatted dry matter) | 7.0 ± 0.6 | 5.2 ± 0.1 | 5.5 ± 0.1 | — | 4.0 ± 1.0 | 1.8 ± 0.2 |

*(−)-epicatechin equivalent
**procyanidin B2 equivalent

It is shown that the methods of the present invention ensure that the high contents of polyphenols, flavonoids and/or proanthocyanidines present in the cocoa beans are preserved in the extracts, so that beside of the favourable aroma profile, optimum yields of healthy ingredients may be obtained in the final chocolate product.

Thus, the chocolate construction kit according to the present invention advantageously provides starting materials for a large variety of high-quality chocolate products, wherein water-soluble undesired hydrophilic components (such as bitter and/or astringent low molecular polyphenols (e.g. catechins)) may be removed while retaining the water-soluble aroma components, polyphenolic components and vitamins of the cocoa beans/nibs and preserving high concentrations thereof due to the low thermal burden.

Hence, it is possible to manufacture many variants of chocolate products, wherein the typical characteristics of the origin, variety and vintage of cocoa bean are perceptible, irrespective of the specific fermentation grade of the used beans/nibs.

Exemplary methods of manufacturing chocolate and chocolate-like products on the basis of the chocolate construction kit, or the extracts obtained in the method according to the first embodiment, respectively, will be given hereinbelow.

Methods for Manufacturing Chocolate Products

The plurality of cocoa bean extraction products produced in accordance with method steps set forth in the first embodiment may be used for the preparation of a large variety of chocolate products, as will be described in the following third embodiment.

Figure 3A:
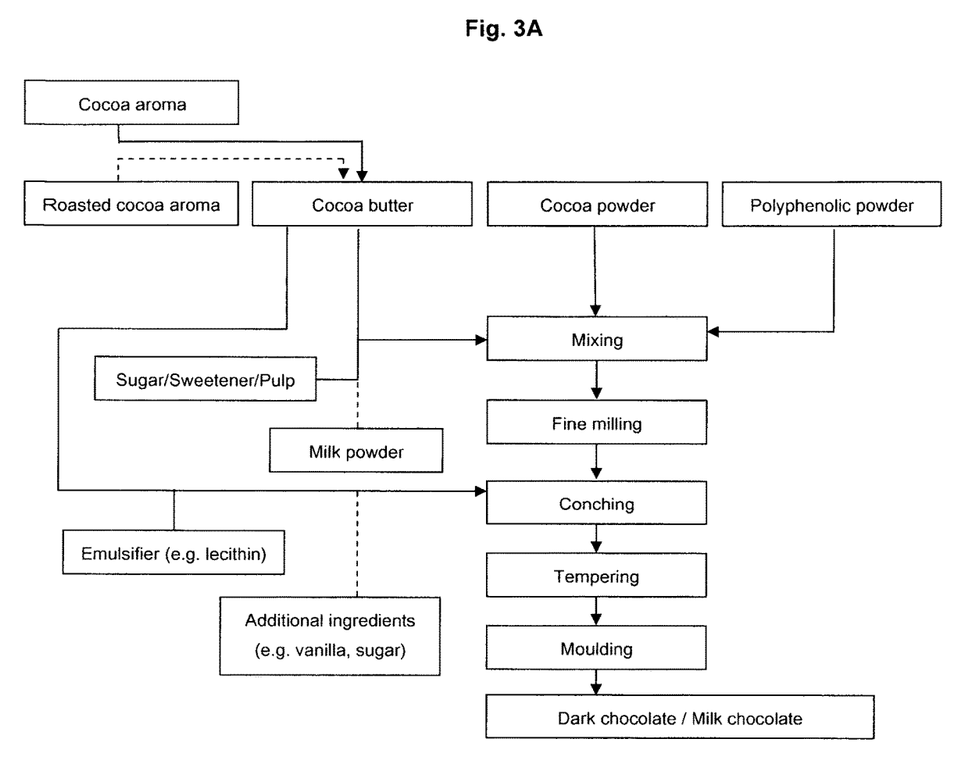
FIG. 3A schematically illustrates an exemplary method for preparing dark chocolate/milk chocolate using the fractions obtained after separation and processing of the fat, solid and water phases.

FIG. 3A illustrates an example of a method for the preparation of dark chocolate and milk chocolate, wherein the cocoa aroma extracts obtained from dearomatisation of the water phase and/or optionally the roasted cocoa aroma and flavors, such as e.g. vanilla, rum and so on may be added prior to or during the conching step.

The conching process redistributes into the fat phase the substances from the dry cocoa that create flavor, while removing unwanted acetic, propionic, and butyric acids from the chocolate, reducing moisture, and mellowing the flavor of the product. The temperature of the conche is controlled and varies depending on the different types of chocolate (from around 49° C. for milk chocolate to up to 82° C. for dark chocolate). While being to some degree dependent on the temperature, the conching duration in conventional chocolate manufacturing processes generally ranges from 16 up to 72 hours in order to achieve good results. In the method according to the present invention, the conching duration is preferably less than 16 hours, more preferably less than 12 hours, typically 10 hours or less. Thus, a loss of desirable aroma characteristics as observed at long conching times does not occur.

Figure 3B:
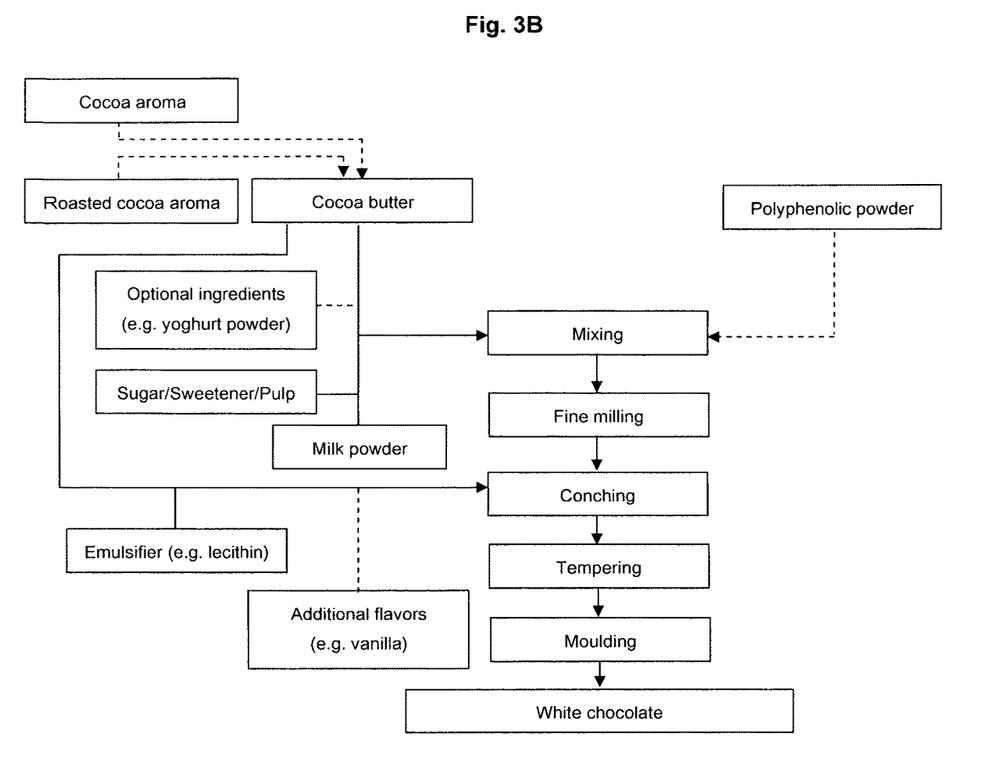
FIG. 3B schematically illustrates an exemplary method for preparing white chocolate using the fractions obtained after separation and processing of the fat, solid and water phases.

As alternative chocolate product that may be manufactured by the method of producing chocolate according to the present invention as indicated in FIG. 3B, white chocolate may be mentioned, which is usually a blend of cocoa butter, sugar, milk solids, emulsifier (e.g. lecithin), as well as optionally vanilla for flavor, depending on the producer's recipe.

Conventional methods for the production of white chocolate involve the use of deodorized cocoa butter. Specifically, cocoa butter is conventionally prepared by methods comprising the alkalization of cocoa liquor, which contributes to high contents of bitter flavor components in the cocoa butter that have to be removed, which may be achieved by means of extraction with organic solvents or steam injection to provide a low-odor, non-bitter and flavorless cocoa butter basis for the further preparation of white chocolate. However, such processes are known to involve a reduction of the contents of vitamins and anti-oxidants in the cocoa butter.

Advantageously, using the herein described techniques, cocoa butter with less bitter flavors may be obtained, so that only gentle cocoa butter processing, if any, is required in order to render it usable for the production of white chocolate, also leading to a preservation of larger contents of desirable components such as vitamins or antioxidants.

In addition, by recombining of the cocoa butter with the cocoa aromas and/or roasted cocoa aroma and/or the polyphenolic powder as obtained by the method of the first embodiment according to the desired taste allows to produce a white chocolate having a characteristic and distinct cocoa flavor.

The chocolate or chocolate-like products obtained by the methods of the present invention may take any suitable form and may, for example, be packaged and sold as a block or a bar, be filled and may be used as a coating, be used in other confectionery and bakery applications (e.g. as a cake coating or filling, a biscuit coating or filling, a sponge coating or filling or a coating layer for an ice cream). Also, the obtained chocolate or chocolate-like products may optionally have further additives added prior to the final use of the product.

Once given the above disclosure, many other features, modifications, and improvements will become apparent to the skilled artisan.

The invention claimed is:

1. A method for processing fermented or incubated cocoa beans comprising the steps of:
    adding water to fermented or incubated cocoa beans or nibs to form a suspension;
    wet grinding said suspension;
    subjecting said suspension to a heat treatment at a temperature of from 43° C. to 65° C.;
    separating the suspension into a water phase (heavy phase), a fat phase (light phase) and a solid phase, said fat phase comprising cocoa butter as a major component and solids and/or water as minor components and said solid phase comprising cocoa powder and water; and
    separately processing the three phases, which comprises the step of:
    (i) neutralizing acetic acid formed during fermentation or formed or added prior to or during an incubation of the cocoa beans in the water phase, or (ii) removing said acetic acid from the water phase by extractive distillation, reactive distillation, extraction, emulsion-type liquid membrane processes, salting out or combinations thereof;
    separating cocoa butter from the fat phase;
    separating cocoa powder from the solid phase; and
    separating cocoa aroma and a polyphenolic powder from at least the water phase.

2. The method according to claim 1, wherein said water phase is subjected one or more concentration step(s) to obtain said cocoa aroma and polyphenolic powder extracts.

3. The method according to claim 2, wherein acetic acid is removed from the water phase prior to or during the concentration step(s).

4. The method according to claim 1, wherein cocoa aroma and polyphenolic powder are extracted from the water phase and the solid phase.

5. The method according to claim 1, further including a drying step of the solid phase in a dryer after separation in three phases to obtain aromatics and cocoa solids.

6. The method according to claim 5, wherein the dryer is a drum dryer.

7. The method according to claim 5, wherein the dryer is a mixing device comprising: a cylindrical, tubular body having an inlet and outlet openings for the solid phase arranged with its axis horizontal and closed at its opposite ends by end plates; a coaxial heating or cooling jacket; and a bladed rotor is supported for rotation in the tubular body, its blades being arranged as a helix and oriented for centrifuging the solid phase being processed and simultaneously transporting it towards the outlet opening, wherein the outlet opening communicates, by means of a duct, with a device for separating the aroma phase from the dried product in order to continuously dry the cocoa solids and separate aromatics.

8. The method according to claim 1, wherein said cocoa processing steps are performed without use of non-water solvents.

9. The method according to claim 1, wherein each of said cocoa processing steps are performed at temperatures of no more than approximately 70° C.

10. A chocolate construction kit comprising the cocoa butter, cocoa powder, polyphenolic powder and cocoa aroma obtained by the method according to claim 1:
    wherein the cocoa aroma comprises a total concentration of 2-acetylpyrazine, methylpyrazine, tetramethylpyrazine, 2,3-dimethylpyrazine, 2,6-dimethylpyrazine, 2,5-dimethylpyrazine, trimethylpyrazine, ethylpyrazine, 2-ethyl-3-methylpyrazine, 2-ethyl-6-methylpyrazine, 2-ethyl-5-methylpyrazine, 2-ethyl-3,6-dimethylpyrazine, 2-ethyl-3,4-dimethylpyrazine, 2,3-diethyl-5-methylpyrazine, 2-isopropyl-3-methoxypyrazine, 2-isobutyl-3-methoxypyrazine, 2-ethyl-3,4-dimethylpyrazine, 1-methyl-1H-pyrrole, ethyl-2-methyl butanoate, 3-methylbutyl acetate, 2-heptanone, hexyl acetate, linaool, benzyl alcohol, 2-phenylethanol, ethyl cinnamate, 2-phenethyl acetate, 2-phenyl-2-butenal, ethyloctanoate, 4-ethyl guaiacol, 4-vinyl guaiacol, vanillin, isobutanal, 2-methyl butanal, isovaleradehyde, acetoin, diacetyl, furfural, 2-acetylfurane, benzaldehyde, 5-methylfurfural, 2-furanmethanol, methional, phenylacetaldehyde, and 4-methylphenol of at least 800 mg/kg based on the total weight of the cocoa aroma; and
    wherein the cocoa aroma has a total concentration of acetic acid, propionic acid, isobutyric acid, 2-methylbutyric acid, 3-methylbutanoic acid, and pentanoic acid of less than 50 g/kg.

11. A method for producing chocolate or chocolate-like products comprising the steps of:
    adding water to fermented or incubated cocoa beans or nibs to form a suspension;
    wet grinding said suspension;
    subjecting said suspension to a heat treatment at a temperature of from 43° C. to 65° C.;
    separating the suspension into three phases, i.e. a water phase (heavy phase), a fat phase (light phase) and a solid phase, said fat phase comprising cocoa butter as a major component and solids and/or water as minor components and said solid phase comprising cocoa powder and water; and
    separately processing the three phases, which comprises the step of:
    (i) neutralizing acetic acid formed during fermentation or formed or added prior to or during an incubation of the cocoa beans in the water phase, or (ii) removing said acetic acid from the water phase by extractive distillation, reactive distillation, extraction, emulsion-type liquid membrane processes, salting out or combinations thereof;

separating cocoa butter from the fat phase;
separating cocoa powder from the solid phase;
separating cocoa aroma and a polyphenolic powder from at least the water phase;
recombining the cocoa aroma extract with the cocoa butter extract;
mixing the recombined cocoa aroma and cocoa butter extracts with said cocoa powder extract, said polyphenolic powder extract and/or milk powder; and
conching said mixture.

12. The method according to claim 11, wherein the recombined cocoa aroma and cocoa butter extracts are mixed with at least said cocoa powder extract and said polyphenolic powder extract.

13. The method according to claim 12, wherein the recombined cocoa aroma and cocoa butter extracts are further mixed with sugar, sweetener or cocoa pulp.

14. A chocolate or chocolate-like product obtained by the method according to claim 11;
wherein the cocoa aroma comprises a total concentration of 2-acetylpyrazine, methylpyrazine, tetramethylpyrazine, 2,3-dimethylpyrazine, 2,6-dimethylpyrazine, 2,5-dimethylpyrazine, trimethylpyrazine, ethylpyrazine, 2-ethyl-3-methylpyrazine, 2-ethyl-6-methylpyrazine, 2-ethyl-5-methylpyrazine, 2-ethyl-3,6-dimethylpyrazine, 2-ethyl-3,4-dimethylpyrazine, 2,3-diethyl-5-methylpyrazine, 2-isopropyl-3-methoxypyrazine, 2-isobutyl-3-methoxypyrazine, 2-ethyl-3,4-dimethylpyrazine, 1-methyl-1H-pyrrole, ethyl-2-methyl butanoate, 3-methylbutyl acetate, 2-heptanone, hexyl acetate, linaool, benzyl alcohol, 2-phenylethanol, ethyl cinnamate, 2-phenethyl acetate, 2-phenyl-2-butenal, ethyloctanoate, 4-ethyl guaiacol, 4-vinyl guaiacol, vanillin, isobutanal, 2-methyl butanal, isovaleradehyde, acetoin, diacetyl, furfural, 2-acetylfurane, benzaldehyde, 5-methylfurfural, 2-furanmethanol, methional, phenylacetaldehyde, and 4-methylphenol of at least 800 mg/kg based on the total weight of the cocoa aroma; and
wherein the cocoa aroma has a total concentration of acetic acid, propionic acid, isobutyric acid, 2-methylbutyric acid, 3-methylbutanoic acid, and pentanoic acid of less than 50 g/kg.

15. The method according to claim 1, wherein the step of separately processing the three phases comprises step (i).

16. The method according to claim 1, wherein the step of separately processing the three phases comprises step (ii).

17. The method according to claim 11, wherein the step of separately processing the three phases comprises step (i).

18. The method according to claim 11, wherein the step of separately processing the three phases comprises step (ii).

* * * * *